United States Patent
Lamb et al.

(10) Patent No.: US 10,108,560 B1
(45) Date of Patent: Oct. 23, 2018

(54) ETHERNET-LEVERAGED HYPER-CONVERGED INFRASTRUCTURE

(71) Applicant: EVOL1-IP, LLC, El Segundo, CA (US)

(72) Inventors: Gary Lamb, Sacramento, CA (US); Patrick Harrington, Sacramento, CA (US)

(73) Assignee: EVOL1-IP, LLC, El Segundo, CA (US)

( * ) Notice: Subject to any disclaimer, the term of this patent is extended or adjusted under 35 U.S.C. 154(b) by 0 days.

(21) Appl. No.: 15/624,537

(22) Filed: Jun. 15, 2017

Related U.S. Application Data

(63) Continuation of application No. 15/265,365, filed on Sep. 14, 2016.

(51) Int. Cl.
*G06F 3/00* (2006.01)
*G06F 13/10* (2006.01)
*G06F 3/06* (2006.01)

(52) U.S. Cl.
CPC ............ *G06F 13/102* (2013.01); *G06F 3/067* (2013.01); *G06F 3/0613* (2013.01); *G06F 3/0647* (2013.01)

(58) Field of Classification Search
CPC ........................ G06F 9/45558; H04L 67/1097
USPC .......................................................... 710/74
See application file for complete search history.

(56) References Cited

U.S. PATENT DOCUMENTS

| | | | | |
|---|---|---|---|---|
| 6,363,411 B1* | 3/2002 | Dugan | .............. | H04M 3/42136 379/201.01 |
| 7,535,913 B2* | 5/2009 | Minami | .............. | H04L 12/5693 370/401 |
| 7,643,468 B1* | 1/2010 | Arregoces | .............. | H04L 12/462 370/351 |
| 8,396,807 B1* | 3/2013 | Yemini | .................. | G06Q 10/06 705/400 |
| 8,601,473 B1* | 12/2013 | Aron | .................... | G06F 9/45533 709/223 |
| 2006/0198389 A1* | 9/2006 | Eriokson | ................. | H04L 47/10 370/466 |
| 2007/0226795 A1* | 9/2007 | Conti | .................... | G06F 21/554 726/22 |
| 2012/0239832 A1* | 9/2012 | Subramanian | ...... | G06F 9/45558 710/48 |
| 2012/0284236 A1* | 11/2012 | Timashev | ........... | G06F 11/1469 707/674 |
| 2014/0025816 A1* | 1/2014 | Otani | .................... | G06F 9/5072 709/225 |

(Continued)

*Primary Examiner* — Titus Wong
(74) *Attorney, Agent, or Firm* — Sheppard Mullin Richter & Hampton LLP; Hector Agdeppa

(57) ABSTRACT

Systems and methods are provided for enabling extensibility of discrete components (e.g., memory, storage, cache (hardware- or software-based), network/fabric, capacity, etc.) within a hyper-converged infrastructure. In the context of extending the storage component, an external storage device is connected to a hyper-converged appliance ("node" or "host") via an Ethernet-based host bus adapter ("HBA"). Utilizing ATA over Ethernet ("AoE") as the communication protocol, storage drives within the external storage device appear as direct-attached storage to the hypervisor of the hyper-converged appliance, extending the pool of storage resources available for allocation by the hyper-visor.

20 Claims, 7 Drawing Sheets

(56) References Cited

U.S. PATENT DOCUMENTS

2014/0226659 A1* 8/2014 Tsirkin .................... H04L 45/74
370/390

* cited by examiner

ETHERNET-LEVERAGED HYPER-CONVERGED INFRASTRUCTURE

CROSS-REFERENCE TO RELATED APPLICATIONS

This application is a continuation of application Ser. No. 15/265,365, filed on Sep. 14, 2016, which are hereby incorporated herein by reference in their entireties.

TECHNICAL FIELD

The disclosed technology relates generally to hyper-converged environment, and more particularly, some embodiments relate to methods and systems of Ethernet-leveraged hyper-converged environment that utilizes Ethernet as the host bus adapter transport medium.

DESCRIPTION OF THE RELATED ART

Converged infrastructures focus on multiple monolithic clusters of discrete hardware appliances, connected together to provide IT services. Although designed to function together, each component could be removed and connected to other hardware components and still function as intended. As each "cluster" was designed to function specifically in its given configuration, scalability proves difficult as extending the capacity of the IT infrastructure requires adding additional shelves of components to the existing solution, requiring complex management hardware/software solutions to ensure data compatibility and functioning. Moreover, adding additional components is limited by the number of shelves available within the solution, after which a new array of components would need to be added. This "one application per server" approach results in low utilization of hardware resources within the network as a single server may have more processing and storage capacity then necessary for even heavy workloads. Complex skills necessary to manage the IT infrastructure and wasted energy within the data center (e.g., cooling systems to maintain sustainable temperature levels) further impact the efficiency and cost of virtualized infrastructures at the enterprise level.

The increasing need for resource availability in IT infrastructures has fueled the continued rise of computer virtualization in an attempt to increase utilization of hardware resources. The focus in the beginning was to consolidate multiple physical machines onto each hardware server (known as a "host"), yielding multiple virtual machines (known as "guests") enabling multiple applications to run simultaneously on the same physical server hardware. Although hardware resource utilization increased, the physical architecture proved to be a limiting factor. Routers, switches, and conversions from one transport medium to another within the traditional consolidated architecture injects a level of latency making full realization of the benefits of virtualization prohibitively costly on a processing level. The increased density of functions operating within the hardware platform puts an unsustainable strain on the components. As virtualization software shrinks the physical footprint, software functionality must be offloaded onto hardware, which the hardware of the consolidated infrastructure was incapable of handling.

To address the unrealized benefits of virtualization, IT administrators have continued to gravitate toward hyper-converged infrastructures. Whereas consolidated infrastructures focused on designing multiple discrete components that could be connected together, hyper-converged infrastructures take a software-centric approach to handling IT infrastructure. Hyper-convergence focuses on small, commodity infrastructure solutions that provide all the necessary components for an IT infrastructure within a single appliance. All computing and storage components are tightly integrated within the same appliance, with management software (commonly referred to as "hypervisors") relied upon to handle the IT management. This approach addresses several of the inefficiencies present in the monolithic, consolidated approach, such as resource utilization rates and management complexity.

BRIEF SUMMARY OF EMBODIMENTS

According to various embodiments of the disclosed technology, methods and systems are provided that enable adding extensibility of discrete components (e.g., memory, storage, cache (hardware- or software-based), network/fabric, capacity, etc.) to hyper-converged IT infrastructures. By enabling extensibility, various embodiments of the technology disclosed herein combine the scalability and functionality benefits of hyper-convergence (e.g., commodity appliances; increased performance through direct-attached architecture) and the flexibility of consolidated infrastructures (e.g., ability to design discrete components for use within a system). Through the use of various embodiments of the technology of the present disclosure, resource utilization rates can increase by eliminating waste associated with adding whole hyper-converged appliances ("nodes") when only one component of the system is exceeding capacity. For example, in the storage context, the ability to extend the storage component by N controllers and/or storage drives alleviates the I/O blender issue that has been exasperated by virtualization. By utilizing an Ethernet-based host bus adapter ("HBA") to connect appliances within the infrastructure, and ATA over Ethernet ("AoE") as the protocol, various embodiments of the technology disclosed herein allow for external devices to appear and be controlled as if direct-attached to the host node, enabling extension not only of physical functions but also virtual functions.

According to an embodiment of the disclosed technology, a method for adding extensibility to a hyper-converged infrastructure is provided. The method comprises installing an Ethernet-based HBA to a hyper-converged node. In various embodiments, the Ethernet-based HBA may be a physical device added to a legacy hyper-converged node, part of a purpose-built hyper-converged node, or be added by flashing an existing Ethernet network interface card within a hyper-converged node to change its personality to that of an HBA. An external storage device is connected to the hyper-converged node by connecting a port of the Ethernet-based HBA of the hyper-converged node to a port on a second Ethernet-based HBA of the external storage device. In some embodiments, the external storage device may be an intelligent storage platform comprising one or more storage controllers and a plurality of storage drives. The hyper-converged node is scanned to discover the connected external storage device, the scanning resulting in MAC addresses of the one or more storage devices, one or more storage controllers, or a combination thereof, of the external storage device being known to the hypervisor running on the hyper-converged node. The communication protocol of the method is AoE, and the one or more storage devices, one or more storage controllers, or a combination thereof, of the external storage device appear as direct attached devices to the hypervisor.

According to an embodiment of the disclosed technology, a hyper-converged infrastructure is provided. The hyper-converged infrastructure allows extension of discrete components. The hyper-converged infrastructure includes a host node comprising: a storage component comprising one or more storage controllers and a plurality of storage drives; a memory component comprising one or more memory devices providing main memory for the host node; a compute component comprising one or more servers and a hypervisor instance running on the one or more servers; a network interface card for enabling network communications; and an Ethernet-based host bus adapter. In various embodiments, the host node may comprise a legacy hyper-converged node or a purpose-built hyper-converged node. The hyper-converged infrastructure further comprises an external computing device comprising one or more physical computing devices designed to increase a service instance of the host node, wherein the external computing device includes an Ethernet-based HBA. Communication between the hypervisor of the host node and the external computing device comprises AoE data packets.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the technology disclosed herein are directed toward systems and methods of hyper-converged solutions. More particularly, various embodiments of the technology disclosed herein relate to use of an Ethernet card or chip as a host bus adapter ("HBA"). An Ethernet-based HBA may be included within purpose-built hyper-converged appliance (also referred to as "nodes"), or can be added to traditional hyper-converged appliance (either through installation of an HBA card or flashing an Ethernet network card in the legacy hyper-converged node to change its personality to that of an HBA). Through the use of this Ethernet-based HBA, external devices can be connected to the hyper-converged node and can be made to appear as direct-attached devices. This can enable capacity extension of a particular component (e.g., memory, storage, cache (hardware- or software-based), network/fabric, capacity, etc.) of the hyper-converged node. For example, in the storage context, through an Ethernet-based HBA additional storage controllers and drives may be connected to the hyper-converged node, showing as direct attached storage ("DAS") to the hypervisor running in the node. Moreover, the use of ATA over Ethernet ("AoE") as the communication medium enables the extensibility to be on-the-fly; additional components may be added to the hyper-converged node during operation, being dynamically discoverable by the hyper-converged node. This results in an immediate increase in the resource pool available for allocation to guests (i.e., virtual machines) running on the hyper-converged node, without the need to drop an entire new hyper-converged node into the system.

Figure 1:
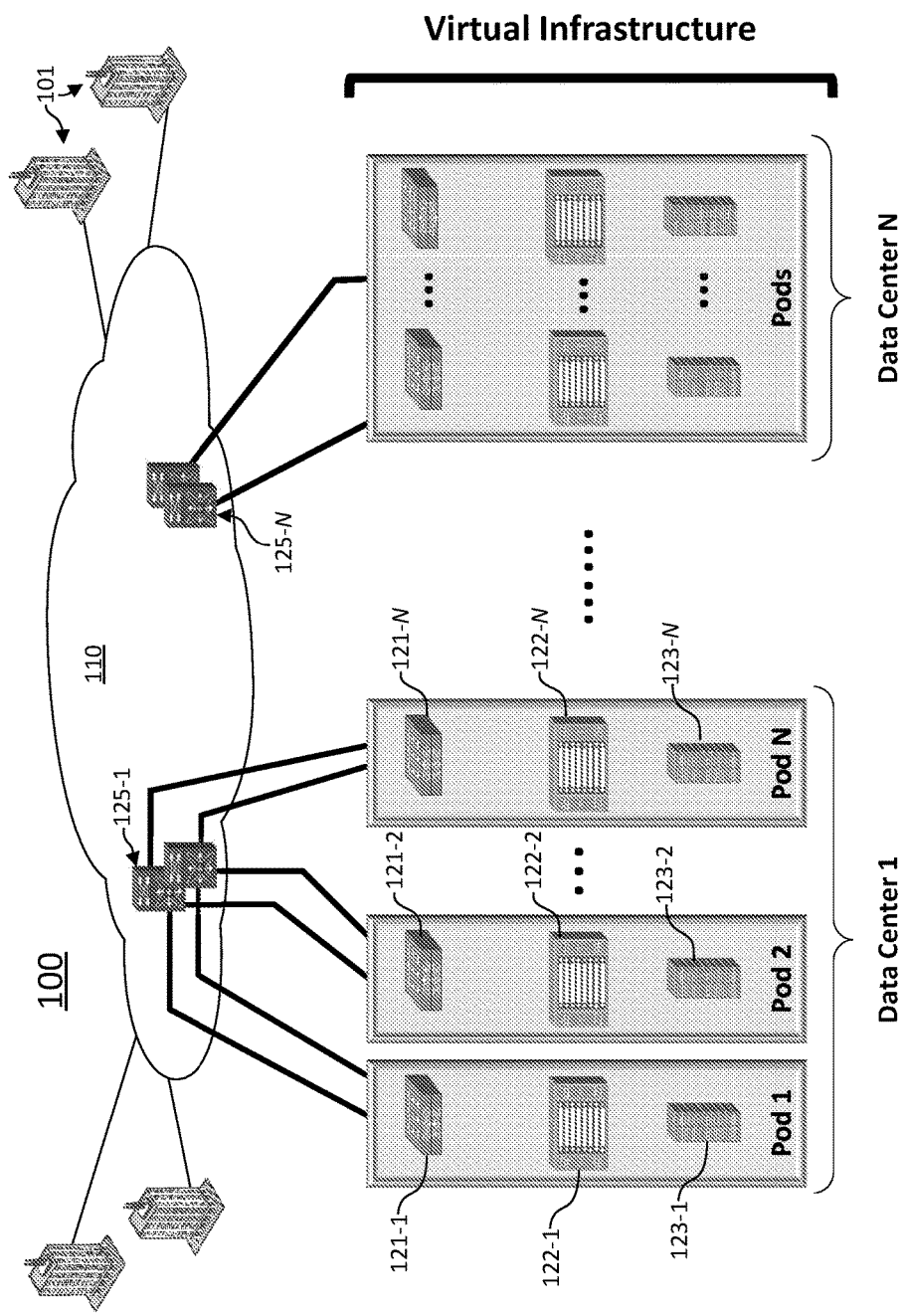
FIG. 1 illustrates an example virtualized IT infrastructure in accordance with various embodiments of the technology described herein.

Before explaining the technology of the instant disclosure in greater detail, it is useful to discuss an example IT infrastructure environment in which embodiments of the technology may be deployed. FIG. 1 illustrates an example virtualized IT infrastructure 100, from the client edge to the data center. After reading this description, one of ordinary skill in the art will understand how the various embodiments disclosed herein can be used in this and other IT infrastructure environments.

As illustrated, clients 101 are connected to the transport network 110. In various embodiments, the transport medium in transport network 110 may include one or more different carrier systems, including but not limited to: T1 or other T-carriers; optical carriers; E-carriers; or other transport carriers. Communication between the clients 101 and the data centers (e.g., Data Center 1) may pass through network equipment within the transport network 110, such as but not limited to dense wavelength division multiplexing ("DWDM") within optical carrier networks (not shown), or physical switches (not shown).

Each of the data center nodes 125 serve as the front edge of the data centers. All data traffic from the transport network 110 enters the data center through the data center nodes 125. As illustrated in FIG. 1, dual data center nodes 125 are utilized for each data center for redundancy and/or fail over. In other embodiments, a single data center node 125 may be used for each data center connected to the transport network 110.

A virtual infrastructure resides within each of the data centers. As seen in this example, multiple data centers (e.g., Data Center 1, Data Center N) may be connected to the transport network 110. Within each data center, service instances comprising a client's 101 virtual infrastructure are present. A service instance is a collection of resources allocated for use by particular virtualized applications of a client 101, each service instance comprising a capacity tier and a cache tier. Each service instance is associated with a collection of virtualized components, represented in FIG. 1 by pods. The components of a pod in this example are virtual versions of hardware components within a hyper-converged node. A virtual switch 121 may be configured to provide a logical switching fabric, enabling networking of virtual machines within a client's 101 virtual infrastructure. Each pod may include its own virtual switch 121 (e.g., virtual switch 121-1 for Pod 1). In various embodiments, the virtual switch 121 may include a connection to a physical hardware networking component within a hyper-converged node. In other embodiments, the virtual switch 121 may be connected to one or more virtual machines running within the pod.

Each pod further includes a virtual compute component 122. The virtual compute component 122 represents one or more hosts servers (i.e., virtual representations of the physical hardware server of a hyper-converged node). By utilizing multiple host servers, the virtual compute component 122 is capable of servicing multiple different guests (i.e., virtual machines) on the same hardware platform by breaking out the CPU into a distributable workload. In this way, the entire CPU can collectively be utilized in a more efficient manner, as opposed to having an entire CPU dedicated to a guest (or tenant) application that utilizes only a fraction of the CPU capacity. In various embodiments, a management application (sometimes referred to as a "hypervisor") is included in the virtual compute component 122. The hypervisor may be configured as a thin operating system that extracts necessary resources to be distributed and/or consumed at the guest level (i.e., the virtual machines running) residing on the host (i.e., the hyper-converged node). The hypervisor manages the resources (e.g., memory space, CPU cycles, storage disks, network/fabric, cache elements, etc.) utilized by the different machines to ensure high utilization and that each virtual machine has sufficient resources for operation.

Each pod further includes a virtual storage component 123. The virtual storage component 123 represents the storage capacity of the hyper-converged node available to each pod. The total amount of storage available within a hyper-converged node is known to the hypervisor, which allocates the virtual storage component 123 according to the needs of each pod. In various embodiments, the virtual storage component 123 may include a virtual storage controller, which is a virtual instance of the storage controller of the hyper-converged node. The virtual storage controller may be presented to each virtual machine within a pod as its own dedicated controller.

Within a given hyper-converged node, one or more pods may operate. For example, a client 101 could utilize a single pod within a hyper-converged node, all the pods within a hyper-converged node, multiple pods spread out across several hyper-converged node (sometimes referred to as clustered hyper-converged nodes), an entire data center of hyper-converged nodes (i.e., all the pods present within a data center), or pods within multiple data centers.

Figure 2:
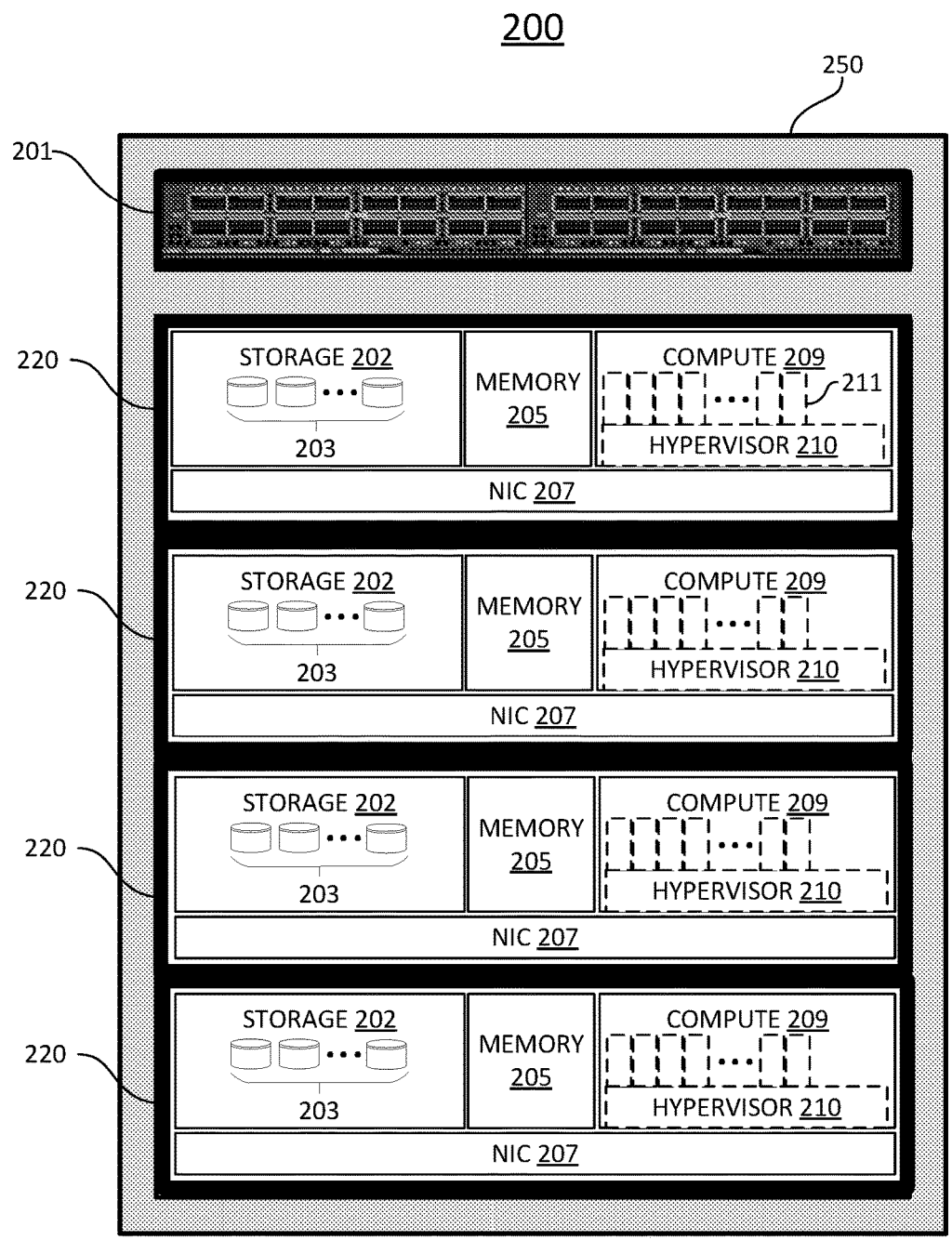
FIG. 2 illustrates an example hardware configuration for a virtualized IT infrastructure similar to that of FIG. 1 in accordance with various embodiments of the technology described herein.

As discussed above, the pods of the virtual infrastructure operate within physical hyper-converged nodes. FIG. 2 illustrates an example hardware configuration 200 for a virtualized IT infrastructure, like the virtualized IT infrastructure 100 discussed with respect to FIG. 1. The hardware configuration 200 is meant to represent the generic components of legacy hyper-converged infrastructure solutions. A person of ordinary skill would understand that, although purpose-built solutions may vary in the type of number of components included, the hardware configuration 200 represents the basic components that are necessary within a hyper-converged node. The technology discussed herein is applicable to all hyper-converged solutions, regardless of particular differences between the actual hardware present.

As illustrated in FIG. 2, this example hardware configuration 200 includes a top of the rack ("TOR") switch 201. The TOR switch 201 serves to connect components within the rack 250 to the data center network. In various embodiments, the TOR switch 201 may be connected directly to the data communication equipment of the data center that provides the connection to the transport network (e.g., the connection to the transport network 110 discussed with respect to FIG. 1). In some embodiments, the TOR switch 201 may be used to connect components within the rack 250 to each other, as well as other components within the data center. In some embodiments, the TOR switch 201 may include a router for transporting communications utilizing a routable protocol.

Within the rack 250, one or more hyper-converged nodes, or hosts, 220 may be included. The terms "host" and "hyper-converged node" are used interchangeably within this specification, unless otherwise noted. Each hyper-converged node 220 in this example is a single, integrated appliance providing all the compute, storage, and memory components necessary to run a full virtualized implementation. Unlike the traditional, monolithic consolidated approach, a single hyper-converged node 220 could be installed in rack 250 and provide a client with an entire virtualized instance of the client's infrastructure (where the hyper-converged node 220 meets the specifications required (e.g., enough storage)) without the need for multiple, disparate appliances (e.g., SAN, server chassis, etc.). Each hyper-converged node 220 includes one or more storage components 202. A storage component 202 includes one or more storage drives 203. In various embodiments, the storage drives may be traditional spinning media (i.e., HDDs), SSDs, NVMe-compatible drives, or other storage media. In various embodiments, the storage drives 203 may include a combination of one or more of the types of storage media discussed above. The storage drives 203 may be configured such that a plurality of storage drives 203 are configured to serve as the capacity tier, while one or more other storage drives 203 are configured to serve as the cache tier. That is, data that is not accessed often is maintained in the drives of the capacity tier, and data that is accessed frequently and/or most recently is maintained in the cache tier. Control of the storage drives 203 may be made possible through a storage controller. In various embodiments, each host 220 may include multiple (e.g., two to three or more) storage controllers within the form factor of the hyper-converged node 220.

Each host 220 in this example further includes a memory component 205. The memory component 205 is the main memory for the host 220, such as random access memory ("RAM"). In various embodiments, the memory component 205 may be dynamic RAM ("DRAM"), static RAM ("SRAM"), or other type of volatile memory. In some embodiments, the memory component 205 may include non-volatile memory in addition to or in lieu of volatile memory, including but not limited to: flash memory; read-only memory ("ROM"); ferroelectric RAM ("F-RAM"); or other non-volatile memory types.

The compute component 209 represents one or more servers within the host 220. The compute component 209 is responsible for processing client requests and serves as the brains of the host 220. In various embodiments, the compute component 209 may comprise internal board server components, blade servers mounted in slots, or other server configurations. In various embodiments, the compute component can be configured as an x86 platform, a relatively inexpensive server architecture, although other platforms can be used. The x86 platform provides a cheap and efficient server that is compatible with many of the most prevalent technologies within the data center, which is in line with the commodity-focus nature of hyper-converged infrastructures. In various embodiments, the compute component 209 of the host 220 may include one or more x86-based servers. In other embodiments, other server architectures may be utilized, depending on the performance specifications of a particular implementation. The example communication method discussed in greater detail below operates independent of the type of server architecture implemented.

Within the compute component 209 runs a hypervisor 210 responsible for managing the resources allocated to each guest 211. Each guest may be a virtual machine running within the one or more servers of the compute component 209. In various embodiments, all the guests running on the node may be used by a single client, whereas in other embodiments the guests within a host 220 may be split among several clients (referred to as multi-tenancy). Each guest may be configured to perform a particular application, depending on the needs of the client. Non-limiting examples of hypervisors 310 that may be used include: ESXi (VMWare); Hyper-V (Microsoft); Xen Servers (Citrix); Red Hat Enterprises Virtualization ("RHEV"); and KVM; among others.

Each hyper-converged node 220 in this example further includes a network interface card ("NIC") 207. The NIC 207 is an interface that may be configured to connect each hyper-converged node 220 to a computer network, either directly or through the TOR switch 201. In various embodiments, the NIC 207 may be designed to enable communication over communication protocols, such as Ethernet, Fibre Channel, Wi-Fi, among others. In some embodiments, the NIC 207 may enable communication over two or more communication protocols.

Typically, each hyper-converged node 220 comprises a single 1- or 2-U box. By tightly integrating all the basic components necessary to provide a virtualized infrastructure, each hyper-converged node 220 simplifies the need to design an entire data center implementation by enabling IT administrators to simply add a common form factor appliance into a rack to achieve a virtualized infrastructure, while reducing the latency with having disparate, network-attached components. If a client needs more compute or storage capacity, additional hyper-converged nodes 220 can be added to the existing node (e.g., clustered together), without the need to build out an entire new monolithic array as previously required, saving money and making scalability easier.

The benefits of hyper-converged infrastructures, however, are limited by the hardware. Hyper-convergence rests on the tight integration of compute, storage, networking, and memory within a single appliance, with a software-centric focus bringing the virtual aspects of infrastructure together with the physical components. Unlike simple consolidated architectures (i.e., monolithic arrays), the components within a hyper-converged node cannot be separated and used separately, if required, as everything is specifically integrated to function as a single unit, with all the resources needed being transparent to the administrator. This integration, however, highlights the limitations of the hardware, as installed hardware is not as flexible as software. Whereas new software can be upgraded through patches or loading a new version, installed hardware is not as easily upgradable. Moreover, the tight integration of hyper-converged nodes does not leave much room to add additional hardware to address limitations in capacity.

For example, storage capacity is one area where traditional hyper-converged nodes have issues. Most current hyper-converged nodes contain only one or two storage controllers and associated storage drives. In some cases, a third storage controller and additional drives may be included based on a client's needs, but the form factor limits full extensibility. That is, only so many pieces of hardware can be included within a node, and to add greater storage capacity would eventually mean reducing the amount of compute and/or memory within the node.

With respect to storage, therefore, each node's storage capacity is limited by the Q-depth of the controllers. Q-depth is the number of commands that a storage controller can send/receive in a single chunk per logical unit number ("LUN"). When the Q-depth of a device is exceeded, performance degrades as requests are not queued and must be resent. Moreover, when exceeded, the traditionally sequential requests may process randomly, increasing the latency in the system. The Q-depth for a node (with volume storage represented by logical unit numbers ("LUNs")) can be calculated as:

$$\text{PortQD} = \text{Host}_1(P^*QD^*L) + \text{Host}_2(P^*QD^*L) + \ldots + \text{Host}_N(P^*QD^*L), \quad (1)$$

where PortQD represents the target port Q-depth, P represents the number of host paths connected to the target port, L represents the number of LUNs presented to the host via the array target port, and QD representing the LUN Q-depth on the host. It is recommended that the total aggregate of the maximum number of outstanding requests from all connected hosts to a port on the controller should be less than the maximum Q-depth of the port itself. The increased density of virtual guests exacerbates the Q-depth issue, as the total number of outstanding requests increases by the number of guests running.

Figure 3B:
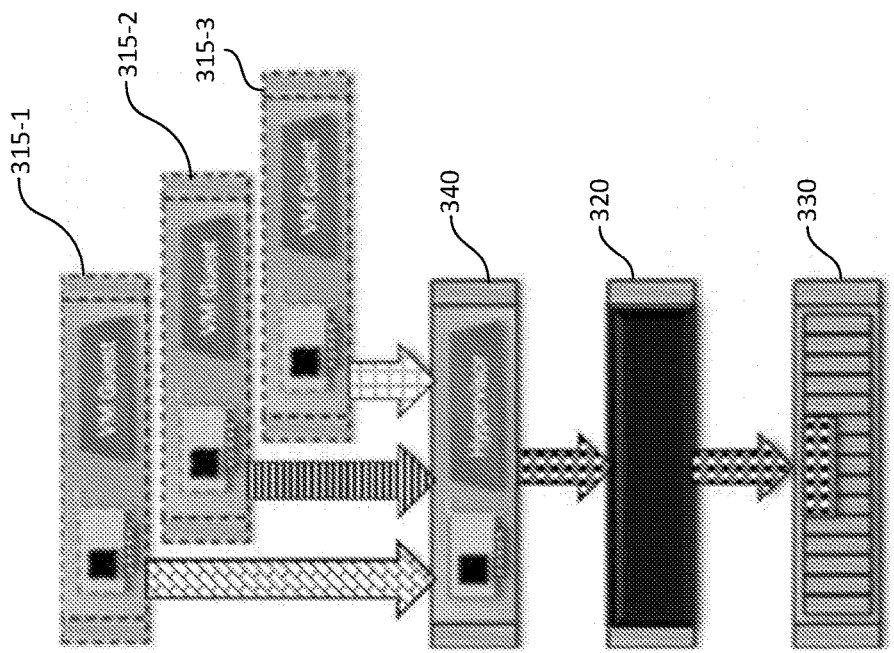
FIG. 3B illustrates the impact of virtualization on handling of I/O requests.
Figure 3A:
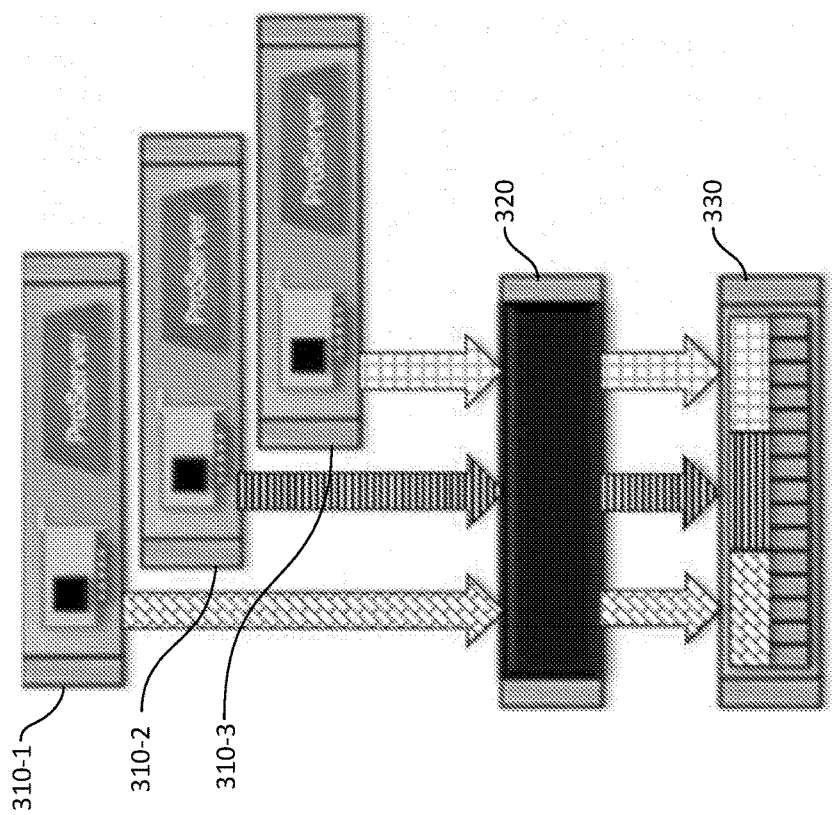
FIG. 3A illustrates handling of I/O requests in a non-virtualized infrastructure.

This is known as the I/O blender effect. FIGS. 3A and 3B illustrate the impact of virtualization on the I/O blender. FIG. 3A illustrates a regular consolidated infrastructure, in which multiple physical servers 310-1, 310-2, 310-3 are connected through a storage appliance 320 (e.g., a block array) to storage drives 330. Each of the physical servers 310-1, 310-2, 310-3 includes its own storage controller that communicates with the storage appliance 320. As illustrated by the different patterns of the arrows, each storage controller of each physical server 310-1, 310-2, 310-3 is associated with a different LUN contained within the storage drives 330. The impact of the I/O blender is not as pronounced, as each server has its own storage controller, and therefore is limited by the full Q-depth of the storage controller.

FIG. 3B illustrates the impact with virtual servers (i.e., virtual machines) are used within a system. The virtual servers 315-1, 315-2, 315-3 perform the same functions as the physical servers 310-1, 310-2, 310-3 discussed with respect to FIG. 3A. Instead of comprising physical components, however, the virtual servers 315-1, 315-2, 315-3 are logical representations of physical components. Each virtual server 315-1, 315-2, 315-3 includes a virtual storage controller, which is a virtual representation of a storage controller allocated to each virtual server. The virtual storage controllers present themselves as direct-attached physical storage controllers, providing the full Q-depth to each individual virtual server 315-1, 315-2, 315-3. Each virtual server communicates through a host 340, which comprises the physical hardware of the node and runs the hypervisor software. The hypervisor provides the virtual representation of the storage controller to each virtual server. Although each virtual server believes that it has full control of the entire physical storage controller in the host 340, it is actually shared among the virtual servers 315-1, 315-2, 315-3. The virtual servers are also sharing the same pool of storage resources (i.e., the same LUN) as that pool of resources are associated with the physical storage controller in the host 340. Each individual virtual server 315-1, 315-2, 315-3 is not given its own LUN, unlike the physical servers 310-1, 310-2, 310-3 in FIG. 3A. Although each individual virtual server 315-1, 315-2, 315-3 may not produce requests in excess of the Q-depth of the storage controller of the host 340 alone, the combination of all the requests from each entity could easily exceed the Q-depth (or IOPS ("I/O read/writes per second") of aggregated spindles of the disks comprising the LUN). Although a host 340 could have sufficient CPU cycles and other resources to handle requests in excess of the Q-depth of the controller, performance will still be capped at that level as all I/O requests must be routed through the ports of the controller in the host 340.

In conventional solutions, the Q-depth may range from 700 to 1024, meaning that (at the high end) a current storage controller can queue up to 1024 requests (and, therefore, traditional nodes are limited to 1024 or 2048, depending on the number of controllers included. Once the queue is filled, subsequent requests will be ignored. For example, if the queue is full, requests 1025, 1026, and 1027 will be ignored while the queue is full. Once an opening occurs, the controller will queue the next received request (request 1028). Therefore, the ignored requests go unfulfilled. This situation is not ideal for many applications.

This issue is further complicated when SSDs are introduced into the system as the storage drives. The lower access time and latency of SSDs means that a single SSD could potentially exceed the Q-depth of a storage controller itself. Each storage controller is matched to storage disks within the hyper-converged node. When traditional spinning media (i.e., hard drive disks "HDDs") are utilized the average time to service an I/O request is 1-3 ms, which is serviced through the associated storage controller. With SSD, the average service time is 20 μs, which is orders of magnitude faster. The same storage controller is also responsible for servicing these much faster I/O requests, with the same Q-depth. In other words, think of the storage controller as a traffic light at an intersection. The same length of time between green lights where traffic is slow (i.e., storage controller used with HDDs) might be too long where faster traffic is present (i.e., storage controller used with SDDs) because with the faster traffic the amount of cars would build up, eventually causing long delays.

To overcome this Q-depth limitation in storage capacity, a conventional solution in hyper-converged environments is to simply add another node to the system. Although touted as an easy way of increasing capacity to clients by providers, adding a node reduces the resource utilization rates of the system due to the excess compute and memory instances provided by each node. Current solutions are unable to address this non-extensibility due to the current focus on commodity solutions. That is, the current market for hyper-converged storage is focused more on providing a single appliance solution. If multiple nodes are present within a system, any extended resource component (e.g., storage drives) would need to be added physically to each box. There is no ability to add more shared resources to the entire system as each node would require a physical connection to the additional drives. This arises from the fact that all the components are directly attached in hyper-converged nodes, due to their integrated nature. Although direct attachment limits the need to manage networked communication between disparate components, it limits the ability to add discrete components to the system.

Although discussed with respect to the Q-depth issue of storage controllers, the concept of non-extensibility is applicable to any hardware component of the hyper-converged node. For example, in some embodiments a lack of memory resources within the node may impact performance of the system, and simply adding more memory resources could resolve the issue without increasing the compute and storage resources in the system at the same time. A person of ordinary skill would understand that the concepts and solutions discussed through the various embodiments of the present disclosure are not limited solely to storage solutions.

In traditional hyper-converged nodes, the components are all directly connected inside the form factor, resulting in physical connections between the components. As discussed above, this physical connection limits the ability to add additional instances of the components when needed. Embodiments of the technology of the present disclosure overcome this non-extensibility by utilizing an Ethernet-based host bus adapter ("HBA") to enable discrete resource components to be added to a hyper-converged node. The Ethernet-based HBA may be used to break the physical relationship between the resource components within the node, and allow additional discrete resource components to integrate with the node hardware/software and function as if it were attached directly. For example, through the use of an Ethernet-based HBA, the Q-depth issue of current hyper-converged solutions in the storage context can be alleviated by enabling the extension of the storage capacity of the node by N-controllers. Moreover, using Ethernet as the transport medium enables parallelism not currently capable with current connection methods of peripheral devices (e.g., SAS, SATA). This parallelism enables greater use of virtual functions within the virtualized environment.

Figure 4:
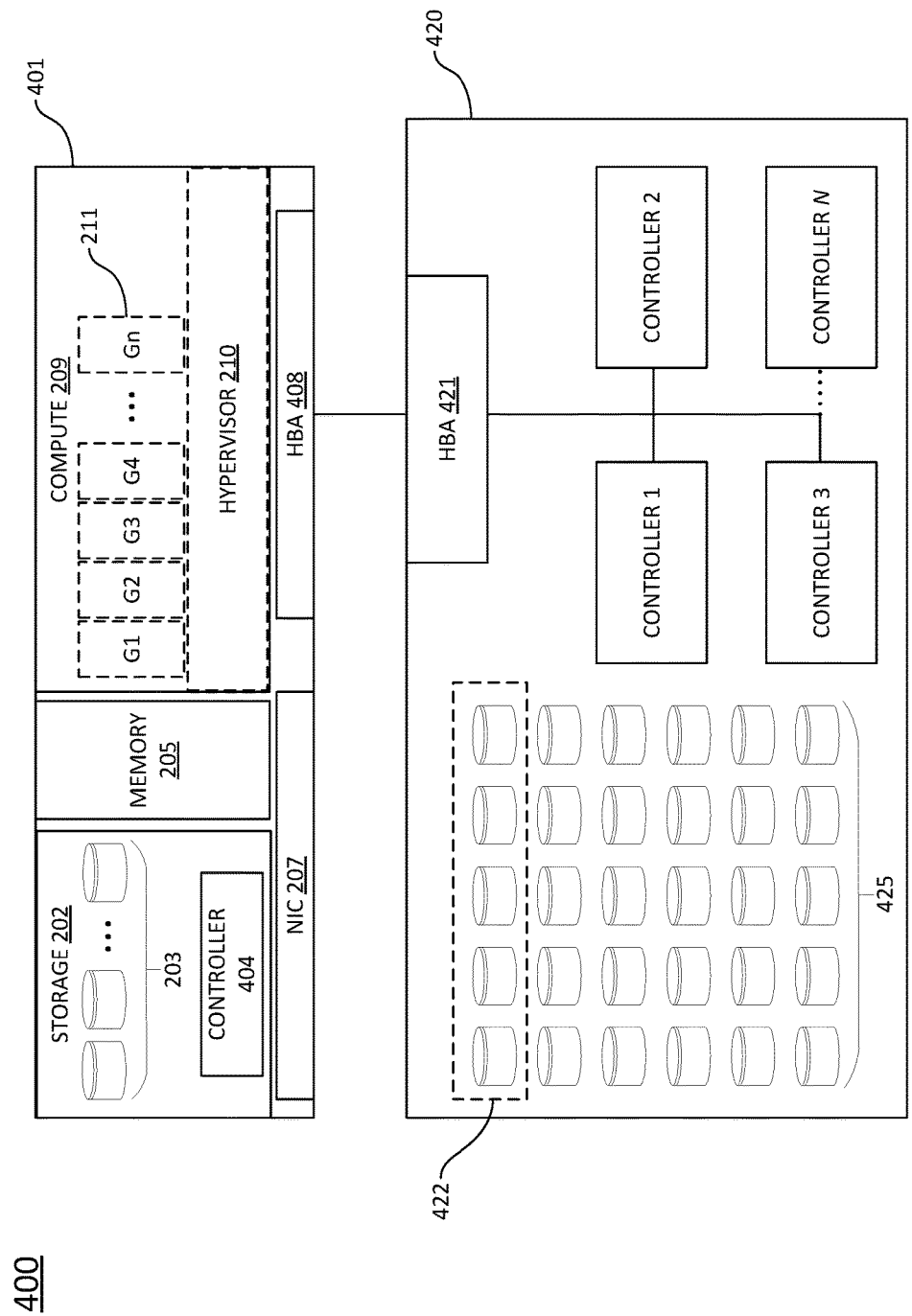
FIG. 4 illustrates an example extensible hyper-converged infrastructure in accordance with various embodiments of the technology described herein.

FIG. 4 illustrates an example extensible hyper-converged infrastructure 400 in accordance with various embodiments of the technology disclosed herein. For ease of discussion, the extensible hyper-converged infrastructure 400 is discussed in the context of extending the storage capacity of a hyper-converged node. Although discussed with respect to extensible storage, the technology disclosed herein is applicable to extending any discrete component within the hyper-converged node. Nothing in this description should be interpreted as limiting the scope of the technology solely to enabling extensible storage.

The extensible hyper-converged infrastructure 400 includes at least one host 401. In various embodiments, host 401 is a hyper-converged node, similar to the commodity cluster discussed with respect to FIG. 2. Similarly numbered entities may operate in a similar manner as those discussed with respect to FIG. 2, unless otherwise noted. As illustrated in the example of FIG. 4, the storage component 202 includes a storage controller 404, responsible for controller access to associated storage drives 203. In various embodiments, the host 401 may include up to three storage controllers 404, although other quantities are also contemplated. As discussed above with respect to FIGS. 3A and 3B, certain performance aspects of the host 401 are limited by the number of physical storage controllers.

To enable extensibility, the host 401 includes an Ethernet-based HBA 408. HBA 408 provides I/O processing and physical connection between a processing component and other devices (e.g., storage devices). HBAs can act as initiators in initiator/target architectures, such as SCSI architectures. In various embodiments, the host 401 may include both a NIC 207 and an HBA 408. The HBA 408 may be included within a host 401 purpose-built for an extensible hyper-converged infrastructure 400. Where legacy hyper-converged nodes are present, extensibility can be provided by adding an Ethernet-based HBA into an open hardware slot within the host 401, or by changing the personality of an Ethernet NIC (other than the NIC 207) to function as an HBA instead of a network interface. The personality of the device can be changed, for example, by utilizing known boot methods, such as the preboot execution environment ("PXE") standard. In various embodiments, the HBA 408 may be an embedded Ethernet interface device embedded within a x86-based server platform. The HBA 408 may be designed, for example, for 10 GbE, 40 GbE, or 100 GbE, or contain ports configured for a combination of those speeds.

As discussed above, discrete components are unable to be added to an existing hyper-converged node due to the tight integration of the components within the appliance. Hyper-convergence takes advantages of the latency benefits achievable through direct-attachment of the necessary components. By utilizing an HBA within a hyper-converged node, the benefits of direct-attached components is attainable in a network-attached like architecture. That is, the easy scalability of hyper-converged infrastructures (i.e., being able to simply add another node for additional compute, storage, and memory resources) is combined with the easy extensibility of consolidated infrastructures (i.e., building discrete components with as much capacity as needed).

As illustrated in the example infrastructure 400 of FIG. 4, the use of the HBA 408 in the host 401 allows a discrete storage component to be connected into the hyper-converged infrastructure. In various embodiments, the discrete storage component may be an intelligent storage platform 420. The intelligent storage platform 420 includes an Ethernet-based HBA 421 of its own. An Ethernet cable can connect one or more ports of the HBA 421 in the intelligent storage platform 420 to one or more ports of the HBA 408 in the host 401. In various embodiments, N-multiple storage controllers Controller 1, Controller 2, Controller 3, Controller N may be included within the intelligent storage platform 420, each associated with one or more storage drives 425 within the intelligent storage platform. The storage controllers Controller 1, Controller 2, Controller 3, Controller N may operate in a similar manner as the storage controller 404 discussed above with respect to the host 401. Intelligent storage platform 420 can include up to N controllers, the total number of controllers depending on the form factor of the intelligent storage platform 420 and the number of storage drives 425 included. In various embodiments, the storage disks 425 may be concatenated together to form a single logical disk, such as logical disk 422. This logical disk 422 can be associated with one or more guests within the host 401, such that the resource can be shared by those quests. In other embodiments, the logical disk 422 could be associated with a particular type of data or function. In various embodiments, the storage drives 425 may comprise HDDs, SDDs, RAM, DRAM, or NAN, or a combination thereof.

To enable communication over Ethernet through the Ethernet-based HBA 408, requests from the hypervisor 210 to the controllers of the intelligent storage platform 420 are transported through ATA over Ethernet ("AoE") protocol. AoE is a network protocol operating on the data link layer (Layer 2) of Ethernet, i.e., the MAC address layer; AoE does not utilize the IP protocol, unlike most other interconnect protocols. By utilizing the combination of an Ethernet-based HBA 408 and AoE, various embodiments of the present disclosure enable disparate devices to appear as direct-attached devices to the hypervisor 210, allowing the hypervisor 210 to treat such devices as if they were tightly integrated into the host 401.

For example, with respect to FIG. 4, the use of the Ethernet-based HBA 408 and AoE enables the N-by storage controllers and storage drives 425 of the intelligent storage platform 420 to show up to the host as direct-attached storage based on the MAC address associated with each device. Moreover, such an intelligent storage platform 420 could be added on the fly (i.e., during operation) simply by connecting the HBAs 408, 421 and rescanning the host 401. The MAC addresses of the devices within intelligent storage platform 420 appear to the hypervisor 210 so that the hypervisor 210 is capable of mapping requests from one or more quests running within the compute component 209 to different storage controllers. With the ability to handle multiple I/O requests through multiple additional storage controllers, the Q-depth issue discussed above is alleviated. The Q-depth of a single host 401 can be increased by N, depending on the number of storage controllers included in intelligent storage platform 420, or in a plurality of intelligent storage platforms 420 attached through the HBA 408.

In various embodiments, the storage disks 425 may include one or more NVMe-compatible drives. NVMe is a logical device interface designed for accessing non-volatile storage media, or flash memory. Unlike traditional storage media, NVMe-compatible drives have embedded controllers. As opposed to extensibility being based on the number of storage controllers, embodiments where NVMe-compatible drives are included in the intelligent storage platform 420 enable extensibility by the number of NVMe-compatible drives present.

The use of AoE as the communication medium further eliminates issues related to TCP/IP based communication protocols, such as iSCSI. Such protocols require messages to pass through the TCP/IP stack in order to be transportable over Ethernet, adding overhead to requests and latency to request resolution. Moreover, upper level networking protocols also must pass through the TCP/IP stack at the same time, meaning that requests for I/O access and network management messages must be processed through the same chain. If a single I/O request holds up (e.g., if the drive to which the request was directed goes down), the hypervisor 210 (which handles the network management functions) will lose communication with the virtual machines (i.e., guests) running on the system.

AoE relies on MAC addresses, which enables the hypervisor 210 to bypass the TCP/IP stack by allowing for direct mapping of one end point (i.e., the HBA 408 acting as the initiator) to a second end point (i.e., the target storage controller of the intelligent storage platform 420). In various embodiments, an overlay network may be utilized to enable creation of secure client tunnels. Non-limiting examples of overlay networks that may be used include VXLAN and SPBm, amongst others. The hypervisor 210 may associate one of the ports of the HBA 408 and one or more ports of the HBA 421 to one or more guests of a given client. Requests from those guests associated with the client will be routed through the ports as configured by the hypervisor 210. This use of the overlay network adds security to the AoE communication by isolating the specific communication occurring between a client's virtual machines and the storage devices. In various embodiments, the second end point may be a specific storage drive 425 or logical disk 422.

Figure 7:
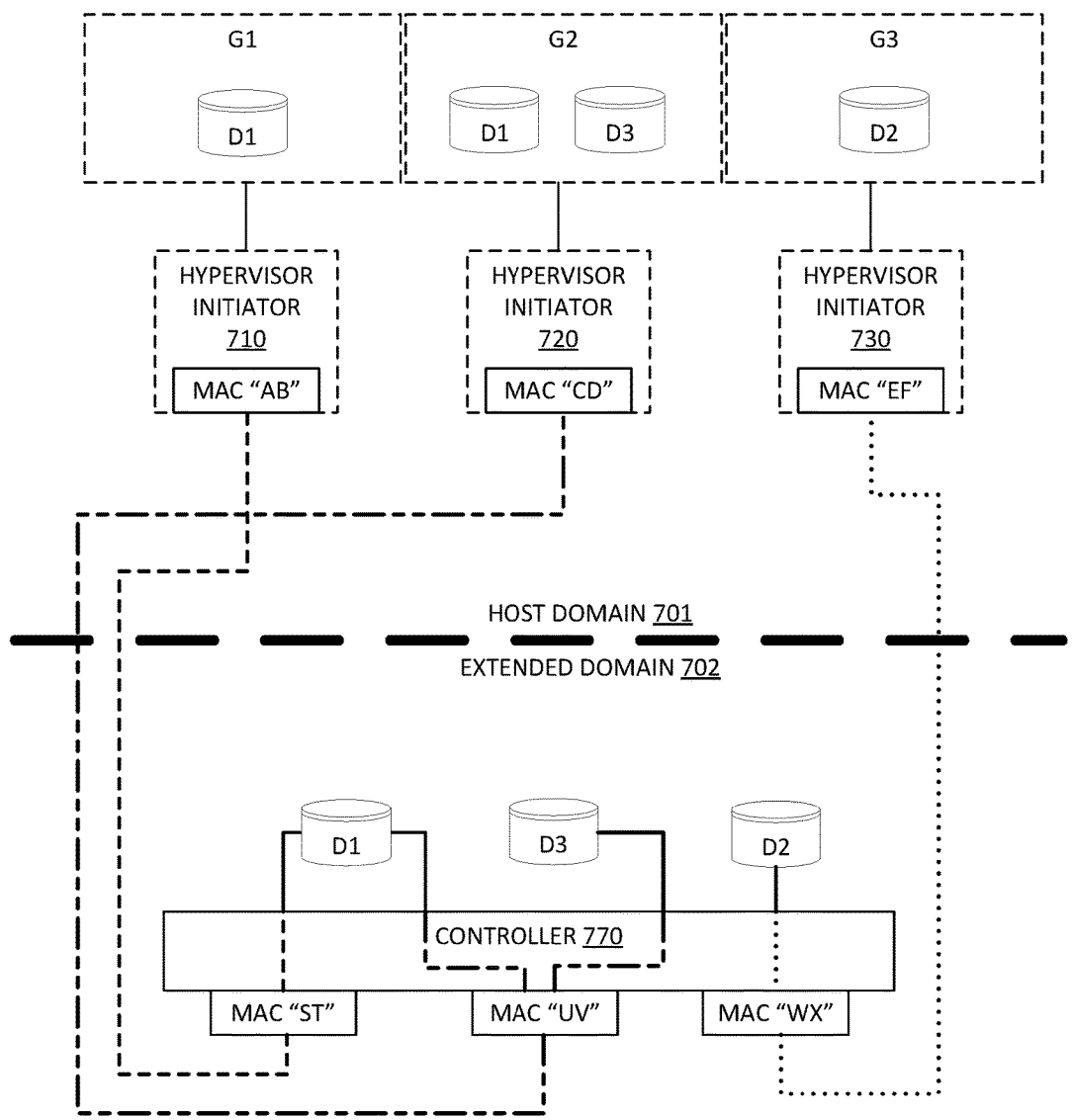
FIG. 7 illustrates an example logical mapping in accordance with embodiments of the technology disclosed herein.

FIG. 7 illustrates an example logical mapping 700 in accordance with embodiments of the technology disclosed herein. The host domain 701 is the environment of the host hyper-converged node, such as the hyper-converged node 401 discussed with respect to FIG. 4. The extended domain 702 is the environment in an external device connected to the host hyper-converged node. In the illustrated embodiment, the extended domain 702 represents the environment of an external storage device, similar to the intelligent storage platform 420 discussed with respect to FIG. 4. The host domain 701 and the extended domain 702 are connected by Ethernet connections, as discussed with respect to FIG. 4.

AoE enables MAC-level communication over the Ethernet protocol, thereby enabling the storage drives D1, D2, D3 of the extended domain 702 to show up as direct attached drives to the hypervisor of the host domain 701. In various embodiments, the hypervisor (not shown) may be configured to have multiple initiators 710, 720, 730. The AoE protocol employs an initiator/target relationship for communication, similar to the iSCSI protocol. An initiator is an endpoint that "initiates," or sends, AoE commands, while the target is an endpoint that receives the send commands and performs data transfer into and out of an I/O device. The hypervisor may configure a hypervisor initiator 710, 720, 730 for one or more guests running on the host node. In the illustrated example, hypervisor initiator 710 is configured to map the MAC address AB to guest G1, hypervisor initiator 720 is configured to map the MAC address CD to G2, and hypervisor initiator 730 is configured to map the MAC address EF to G3.

Utilizing an overlay network, the hypervisor may map each hypervisor initiator 710, 720, 730 to a specific MAC address of a device within the extended domain 702. For example, the hypervisor may map the hypervisor initiator 720 to the MAC address UV of the extended domain 702. The MAC address UV may be assigned to a combination of storage drives D1 and D3 (i.e., the MAC address UV may be assigned to a LUN representing D1 and D3). By doing this, the drives D1 and D3 may appear to guest G2 as dedicated, direct-attached storage drives. When commands are sent to the MAC address UV, the storage controller 770 knows that the commands should be serviced by disks D1 and D3. In various embodiments, one or more storage drives may have multiple MAC addresses associated with the drives. For example, D1 has the MAC address UV associated with it (through the LUN with D3), as well as the MAC address ST. The hypervisor can may the hypervisor initiator AB to MAC address ST, enabling the drive D1 to appear like a dedicated, direct-attached storage drive to guest G1. In some embodiments, a MAC address in the extended domain 702 may be associated with a single storage drive, as illustrated with MAC address WX.

Although discussed with respect to the intelligent storage platform 420 of FIG. 4, other external storage devices may be used in various embodiments of the technology disclosed herein. For example, in some embodiments a RAID ("redundant array of independent disks") array may be connected through the HBA 408 to allow extensible RAID storage to be added to the host 401. A RAID array differs from a JBOD ("just a bunch of disks") in that the RAID array provides varying levels of data redundancy, whereas a JBOD merely provides additional physical disks without any particular RAID functionality.

Figure 5:
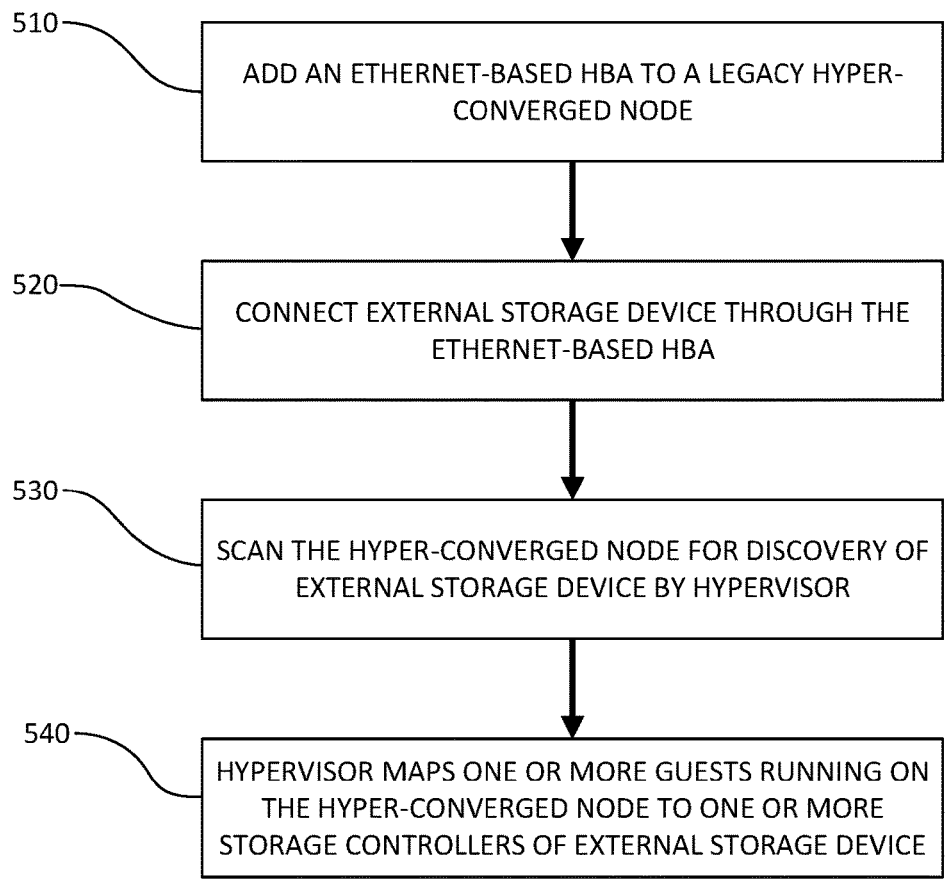
FIG. 5 illustrates a method of adding extensibility to legacy hyper-converged nodes in accordance with embodiments of the technology described herein.

FIG. 5 illustrates an example method of adding extensibility to legacy hyper-converged nodes in accordance with embodiments of the technology disclosed herein. For ease of discussion, the method is described with respect to adding extensible storage to a legacy hyper-converged node. A legacy hyper-converged node is a device currently available for use in hyper-converged infrastructures, similar to the hyper-converged node discussed with respect to FIG. 2. At 510, an Ethernet-based HBA is added to the hyper-converged node. In various embodiments, a physical HBA card may be added within the form factor of the legacy hyper-converged node where there is an available slot within the legacy hyper-converged node. In various embodiments, an Ethernet network interface card within the legacy hyper-converged node may be changed to function as an HBA. Such a change in personality of the card may be accomplished through PXE-booting the card to change the code.

At 520, an external storage device may be connected to the legacy hyper-converged node through the HBA. In various embodiments, the external storage device may be an intelligent storage platform similar to the intelligent storage platform 420 discussed with respect to FIG. 4. In some embodiments, the external storage device may have RAID functionality, and be configured with a read/write cache associated with a RAID logical unit number ("LUN"). In various embodiments, multiple ports of the external device may be connected to multiple ports of the HBA of the legacy hyper-converged node using Ethernet cables.

At 530, the legacy hyper-converged node is scanned. Scanning enables discovery of newly connected devices, similar to the standard discovery process that occurs when USB devices are connected to running computers. The external storage device is discoverable due to the use of the Ethernet-based HBA and the AoE protocol. Using AoE, the external device is identifiable by MAC address, eliminating the need for a dynamic addressing of devices like traditional Ethernet. Upon discovery, the external storage device appears like a direct-attached device, instead of network-attached, thereby enabling exploitation of the benefits of hyper-convergence without the tight integration of all components within one appliance. Moreover, discoverability enables external devices to be connected on the fly (i.e., the infrastructure does not need to be powered down to add more components). For example, other external devices (other than external storage devices) may be added to the system in other embodiments to allow extensibility of other components and functions (e.g., memory, storage, cache (hardware- or software-based), network/fabric, capacity, etc.) of the system.

At 540, with the external device discovered, the hypervisor is capable of allocating resources available within the external device to one or more guests. For example where the external device is an external storage device, the hypervisor is capable of mapping one or more guests to one or more storage controllers of the external storage device and/or one or more storage disks within the external storage device. Therefore, resource utilization within the hyper-converged infrastructure is increased as only additional resources for the particular instance (e.g., memory, storage, cache (hardware- or software-based), network/fabric, capacity, etc.) is added, as opposed to an entire new node containing instances of all components (e.g., memory, compute, etc.). Through utilization of the Ethernet-based HBA and AoE, embodiments of the technology disclosed herein provide hardware-assisted offloading of software functions, thereby reducing the "virtualization tax."

Although discussed with respect to extensible storage, the method of FIG. 5 can be used to extend other components of the legacy hyper-converged node without the need for adding an entire new node. For example, if additional on-board memory is necessary for the node, an external device containing a bank of memory may be connected through the HBA. A person of ordinary skill would appreciate that the example embodiments disclosed herein are used for explaining the extensibility provided by the technology disclosed herein, and should not be interpreted to limit the scope of the claims.

The ability to add extensibility to hyper-converged nodes allows for greater exploitation of single root I/O virtualization ("SRIOV"), which is a standard designed for enabling multiple virtual machines to share a single I/O device. SRIOV relates to physical functions and virtual functions. Physical functions are full-featured computing functions, such as physical ports and devices. A physical function is typically identified at the host level (i.e., the hypervisor level), meaning that the host has the ability to fully control the physical function, from handling requests to configuring specific ports. Virtual functions are similar to physical functions, but lack a full range of configuration capabilities. That is, a virtual function is only capable of moving data in and out of the I/O device; virtual functions are unable to independently configure the physical device. At the host level, the initiator for requests is the physical function as the hypervisor sends all communications from the plurality of virtual machines to the attached devices through the same interface. With virtual functions, the initiator can be migrated to the guest level, allowing each guest to act as its own initiator. This is possible through SRIOV because the virtual function appears to each quest as a dedicated hardware solution. It is as if the targeted device is allocated solely to a particular guest through the virtual function.

By leveraging Ethernet as the transport medium and AoE as the communication protocol, not only can physical functions (i.e., additional physical devices) be extended but virtual functions can also be extended. A guest with a virtual function can bypass the hypervisor and communicate directly with the device of the virtual function, reducing the amount of management performed by the hypervisor. This ability to extend virtual function provides the ability to individually extend a service instance for a client without necessarily extending capacity for all clients running within the node. For example, in the storage context, in addition to being able to extend the storage capacity available to all guests running on a node, various embodiments of the technology disclosed herein enables individual extensions of service instances (i.e., cache tier or capacity tier) for each client, based on their needs. If one client is dragging down performance by monopolizing most of the common storage capacity, an additional cap of storage capacity can be provided to that particular user to ensure that its resource needs do not monopolize the resources allocated to other clients. In other words, each individual client can be provided with customizable extended resources to avoid any "noisy neighbor" issue related to shared resources.

The parallelism of Ethernet and AoE further enables greater use of virtual functions. More independent virtual functions can operate simultaneously over the same connection. Client tunneling (using an overlay fabric as discussed above) ensures that no other client has access to virtual functions allocated to other clients. As the hypervisor is not involved in the virtual function communication, less work is required on the part of the hypervisor to manage all communications occurring, saving processing requirements. By leveraging Ethernet as the transport medium, embodiments of the technology disclosed herein enable parallel physical and virtual functions in real-time, enabling greater use of virtual functions within a hyper-converged node. This parallelism and ability to add additional component instances allows a single hyper-converged node to service a greater number of virtual machines.

By enabling greater use of virtual functions within a hyper-converged infrastructure, important aspects of the hyper-converged infrastructure can be migrated to the "cloud." Cloud computing leverages remote servers accessible over a network such as the Internet to store, manage, and process data, rather than relying on local hardware. Utilizing Ethernet as a transport medium in accordance with embodiments of the technology disclosed herein enables cloud architectures to be more fully integrated into the hyper-converged infrastructure. For example, a client's virtual infrastructure, like the infrastructure discussed with respect to FIG. 1, may sometimes need to be migrated from one hyper-converged node to another. This may be required, for example, if there is a hardware failure within a node, or if all or part of a data center is down due to issues or maintenance. Most hypervisor software has compatibility for migrating virtual machines while powered off, in suspended operating mode, or during live operation. For example, VMWare allows live operation migration through the vMotion utility.

When migrating virtual machines during live operation, however, the cache tier of a client's service instance is generally lost as the cache tier is tied to hardware within the originating node. The cache tier is responsible for keeping track of requests being processed for a particular client. This loss of the cache tier is even more pronounced when virtual machines must be migrated from one data center to another. Before the virtual machines can continue operating, the cache within the cache tier must be built back up, ensuring that no requests are lost due to the migration. In some situations, this can take upwards of 15 minutes, delaying getting the client's service instance back up to speed.

Embodiments of the technology disclosed herein enable the cache tier of a client's service instance to implemented as a virtual function, thereby allowing the cache tier to be moved out of the hyper-converged node. In this way, the cache is not tied to the hyper-converged node (i.e., host) from which the virtual machines originate during migration. The AoE protocol allows the administrator to have the same cache tier visible to multiple hosts at the same time over an Ethernet connection. When an administrator needs to migrate a client's virtual machines to another host, the new host already has knowledge of the cache associated with the virtual machines. The hypervisor need only discover the MAC address of the migrated virtual machines. The ability to extend the physical capacity of the hyper-converged node on the fly allows extension of virtual functions within the system. Because of this, a client's service instance can be provided entirely as virtual functions (i.e., a virtual capacity function and a virtual cache function), freeing the client from dependence on a particular hyper-converged node or cluster of nodes and enabling the client's virtual infrastructure to be placed anywhere without extended periods of down time.

Figure 6:
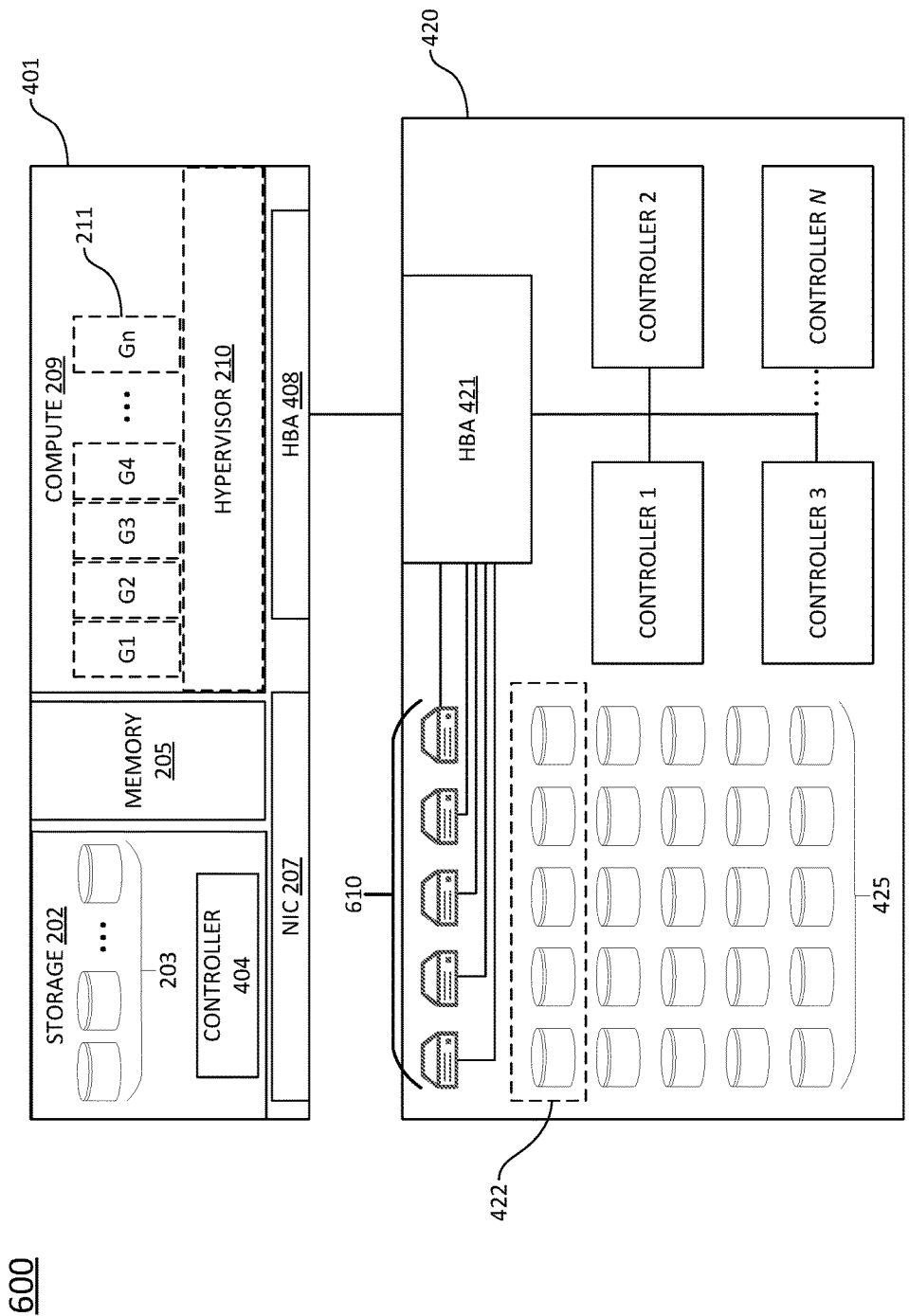
FIG. 6 illustrates another example extensible hyper-converged infrastructure in accordance with various embodiments of the technology described herein.

The combination of NVMe and AoE in various embodiments allows even greater extension of virtual functions. As discussed above with respect to FIG. 4, using NVMe-compatible devices enables extension of discrete components (e.g., storage, memory, network/fabric, cache elements, capacity, etc.) to be based on the number of NVMe-compatible devices present, instead of being bound by the number of external controller elements. FIG. 6 illustrates an example extensible hyper-converged infrastructure 600 in accordance with various embodiments of the technology disclosed herein. The example infrastructure 600 is similar to the extensible hyper-converged infrastructure 400 discussed with respect to FIG. 4, and like referenced elements operate in a similar manner as those in FIG. 4 unless otherwise noted.

The presence of NVMe-compatible devices increases the overall benefits of the technology disclosed herein. As illustrated in FIG. 6, the intelligent storage platform 420 may include one or more NVMe-compatible drives 610. NVMe drives include an embedded controller, unlike traditional HDDs or SSDs that must be combined with an external storage controller. Unlike the traditional storage controller that has a single queue (as discussed above), the embedded NVMe controller is designed with multiple queues (64 ring queues), each capable of processing 64 commands. That is, each NVMe controller has a potential Q-depth of 4096, as opposed to the maximum 1024 Q-depth of traditional storage controllers. Moreover, this Q-depth is dedicated to a each NVMe-compatible drive 610 individually, as opposed to traditional HDDs and SSDs that must share the Q-depth of the storage controller with one or more other storage media.

The use of the Ethernet-based HBA and AoE in accordance with the technology disclosed herein allows for NVMe-compatible devices to be added to legacy hyper-converged infrastructures. For example, in the context of extensible storage illustrated in FIG. 610, each individual NVMe-compatible drive 610 may be assigned by the hypervisor 210 to a guest (e.g., G1), based on the MAC address of the NVMe-compatible drive 610 in some embodiments. This direct addressing is capable through the use of AoE, which enables the NVMe-compatible drives 610 to show up as direct-attached drives to the hypervisor 210. This allows for greater hardware assisted offloading of virtualized functions by allowing increased Q-depth for individual guests, independent of the allocated shared resources. Moreover, AoE avoids the latency issues related to communication through the IP protocol stack, enabling the line speed communication of NVMe to be achieved without the need for direct attachment of the NVMe-compatible drives 610.

At the host level, NVMe-compatible drives 610 may be integrated into legacy hyper-converged infrastructures without the need for specialized and/or proprietary connection and cabling methods to attach NVMe devices to non-NVMe capable hardware. Currently, NVMe technology cannot be directly integrated into existing hyper-converged IT infrastructures because of hardware and software incompatibility. By eliminating the need to rely on the physical connection of devices within a hyper-converged infrastructure, the technology disclosed herein allows for NVMe-compatible devices to be integrated into existing IT infrastructures without necessitating the need for a total overhaul (i.e., a "forklift upgrade") in order to take advantage of NVMe.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of extending storage capacity in a hyper-converged infrastructure, comprising:
   installing an Ethernet-based host bus adapter to a first host node, the first host node including a computing component running a hypervisor responsible for allocating resources to one or more guest machines;
   connecting an external storage device to the first host node by connecting a first end of an Ethernet cable to a first port of the Ethernet-net based host bus adapter of the first host node, and connecting a second end of the Ethernet cable to a first port of an Ethernet-based host bus adapter within the external storage device,
   wherein communication between the first host node and the external storage device comprises ATA over Ethernet (AoE) data packets; and
   scanning the first host node to discover the connected external storage device such that the first host node is identifiable to the hypervisor by media access control (MAC) addresses of one or more storage drives of the external storage device, thereby making the one or more storage drives within the external storage device appear as direct attached storage to the hypervisor.

2. The method of claim 1, installing an Ethernet-based host bus adapter comprises inserting an Ethernet-based host bus adapter card into a hardware domain of the first host node.

3. The method of claim 1, installing an Ethernet-based host bus adapter comprises converting an Ethernet connection device within the first host node into an Ethernet-based host bus adapter.

4. The method of claim 3, wherein the Ethernet connection device comprises one of an Ethernet network interface card or an Ethernet network interface chip.

5. The method of claim 1, wherein the external storage device comprises a plurality of storage disks and a plurality of storage controllers.

6. The method of claim 5, wherein the external storage device is configured to provide RAID functionality.

7. The method of claim 6, wherein the external storage device is further configured to include a read/write cache associated with a RAID logical unit number ("LUN").

8. The method of claim 5, wherein the plurality of storage devices comprises physical storage drives, logical storage disks, or a combination thereof.

9. The method of claim 1, wherein the external storage device comprises a plurality of Ethernet controllers.

10. A hyper-converged infrastructure, comprising:
    a host node, comprising:
        a storage component comprising one or more storage controllers and a plurality of storage drives;
        a memory component comprising one or more memory devices providing main memory for the host node;
        a compute component comprising one or more servers and a hypervisor instance running on the one or more servers;
        a network interface card for enabling network communications; and
        an Ethernet-based host bus adapter;
    an external computing device comprising one or more physical computing devices design to increase a service instance of the host node, wherein the external computing device includes an Ethernet-based host bus adapter;
    wherein communication between the hypervisor instance of the host node and the external computing device comprises ATA over Ethernet (AoE) data packets addressed based on a media access control (MAC) layer address associated with each of at least one of the one or more storage controllers and the plurality of storage drives, the storage component appearing to be direct attached to the hypervisor instance.

11. The hyper-converged infrastructure of claim 10, wherein the external computing device comprises an external storage device for increasing a storage capacity of the host node, the external storage device comprising a plurality of storage disks and a plurality storage controllers.

12. The hyper-converged infrastructure of claim 11, wherein the external storage device is configured to provide RAID functionality.

13. The hyper-converged infrastructure of claim 11, wherein the plurality of storage devices comprises physical storage drives, logical storage disks, or a combination thereof.

14. A method of adding extensibility to a hyper-converged infrastructure, comprising:
    installing an Ethernet-based host bus adapter to a hyper-converged node;
    connecting an external storage device to the hyper-converged node by connecting a port of the Ethernet-based host bus adapter of the hyper-converged node to a port on a second Ethernet-based host bus adapter of the external storage device; and
    scanning the hyper-converged node to enable discovery by a hypervisor running on the hyper-converged node of one or more storage devices, one or more storage controllers, or a combination thereof, of the external storage device;
    wherein the communication protocol is ATA over Ethernet (AoE) and the one or more storage devices, one or more storage controllers, or a combination thereof, of the external storage device appear to the hypervisor as direct-attached devices by way of MAC addresses of at least one of the one or more storage devices, the one or more storage controllers, and a combination thereof identified by the scanning.

15. The method of claim 14, installing an Ethernet based host bus adapter comprises adding a physical card within a form factor of the hyper-converged node, the physical card designed to function as an Ethernet-based host bus adapter.

16. The method of claim 14, installing an Ethernet-based host bus adapter comprises changing an Ethernet network interface card into an Ethernet-based host bus adapter by changing code of the Ethernet network interface card.

17. The method of claim 16, wherein changing code of the Ethernet network interface card comprises Preboot eXecution Environment (PXE)-booting the Ethernet network interface card.

18. The method of claim 14, wherein the external storage device comprises an intelligent storage platform having N controllers.

19. The method of claim 14, wherein the external storage device comprises an intelligent storage platform having N Non-Volatile Memory Express (NVMe)-compatible drives.

20. The method of claim 14, further comprising mapping, by the hypervisor, one or more guest virtual machines running on the hyper-converged node to one or more storage devices of the external storage device.

* * * * *